(12) United States Patent
Musa et al.

(10) Patent No.: US 7,390,430 B2
(45) Date of Patent: Jun. 24, 2008

(54) CURABLE LIQUID COMPOSITIONS CONTAINING BISOXAZOLINE

(75) Inventors: Osama M. Musa, Hillsborough, NJ (US); Ruzhi Zhang, Pennington, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/556,193

(22) PCT Filed: Feb. 17, 2004

(86) PCT No.: PCT/US2004/004731

§ 371 (c)(1),
(2), (4) Date: Nov. 10, 2005

(87) PCT Pub. No.: WO2005/085384

PCT Pub. Date: Sep. 15, 2005

(65) Prior Publication Data

US 2007/0032578 A1    Feb. 8, 2007

(51) Int. Cl.
C09K 3/00 (2006.01)
B01F 17/00 (2006.01)
C09B 67/00 (2006.01)
C08G 18/62 (2006.01)
C08G 18/00 (2006.01)
C08G 65/00 (2006.01)
C08G 73/06 (2006.01)
C08G 67/02 (2006.01)

(52) U.S. Cl. ............... 252/182.18; 106/287.24; 106/287.21; 525/451; 525/540; 528/417; 528/423; 528/392; 252/183.11; 252/182.23; 252/182.34

(58) Field of Classification Search ........... 524/612, 524/597, 606, 105, 556
See application file for complete search history.

(56) References Cited

U.S. PATENT DOCUMENTS 3,879,357 A * 4/1975 Wingler et al. ............. 526/64
4,731,398 A * 3/1988 Huber et al. ............... 523/500
5,338,828 A    8/1994 Hefner et al.
5,356,947 A   10/1994 Ali et al.
5,439,978 A    8/1995 Parkinson et al.
6,620,905 B1 * 9/2003 Musa ....................... 528/423

FOREIGN PATENT DOCUMENTS

| EP | 0222165 | 5/1987 |
| EP | 1 288 201 | 5/2003 |
| JP | 07165838 A * | 6/1995 |
| WO | WO 91/06587 | 5/1991 |
| WO | WO 9106587 A1 * | 5/1991 |

OTHER PUBLICATIONS

Gerisch et al, "Rhodium(III) and Rhodium(II) Complexes of Novel Bis(oxazoline) Pincer Ligands", (Organometallics 2003, 22, 47-58).*
Jones et al, Application of Bis-2-Oxazoline/Bismaleimide resins to high-performance composites, 1993, Antec '93, vol. II, p. 1979-1985.*
M. Gerisch et al., Organometallics 2003, 22, 47-58.
Nakahama, Sejichi et al.: "Anionic Living Polymerization of Styrenes Containing Electron-withdrawing Groups"; Makromol. Chem., Macromol. Symp. 67, 223-236 (1993).

* cited by examiner

Primary Examiner—Vasu Jagannathan
Assistant Examiner—Karuna P Reddy
(74) Attorney, Agent, or Firm—Jane E. Gennaro

(57) ABSTRACT

Difunctional oxazoline resins, which may be produced in a convenient one-step reaction from an arylalkylene dinitrile by reaction with an amino alcohol, are used in compositions with an additional curable compound or resin containing one or more carbon to carbon double bonds. The composition can be cured to a thermoset material, the curing mechanism occurring by the zwitterion polymerization of the bisoxazoline resin with the resin containing the one or more carbon to carbon double bonds. The reaction occurs without the need for curing initiators.(I)

(I)

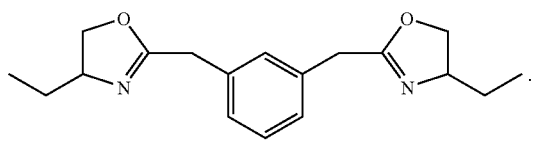

3 Claims, No Drawings

CURABLE LIQUID COMPOSITIONS CONTAINING BISOXAZOLINE

FIELD OF THE INVENTION

This invention relates to liquid compositions containing bisoxazoline compounds that can be rapidly cured to thermoset materials suitable for use as adhesives and encapsulants.

BACKGROUND OF THE INVENTION

A common mode of electronic packaging involves affixing semiconductor devices onto substrates by means of an adhesive or encapsulant. The more prominent uses are the bonding of integrated circuit chips to lead frames or other substrates, and the bonding of circuit packages or assemblies to printed wire boards. Some of the performance properties for these applications are provided by the use of thermosetting materials for the adhesives or encapsulants.

U.S. Pat. No. 6,265,530 discloses an adhesive composition for use in electronic devices that comprises thermosetting polyfunctional maleimide compounds, polyfunctional vinyl compounds, and suitable curing initiators.

It is known that a monofunctional 2-oxazoline will react with a mono-functional vinyl compound such as p-chlorophenylmaleimide through a zwitterion polymerization (Rivas, B. L.; Sanhueza, E. *Polymer Bulletin* 1999, 42, 281, and references cited therein). Solution spontaneous copolymerization of 2-methyl-2-oxazoline as the nucleophilic monomer with p-chlorophenylmaleimide as the electrophilic monomer in the absence of initiator provided linear polymeric materials. However, these materials are not thermosetting materials.

The inventors discovered that the use of a bisfunctional oxazoline as a nucleophilic monomer in zwitterion polymerization in bulk provides materials capable of being thermoset.

SUMMARY OF THE INVENTION

This invention is directed to a curable composition that is a liquid at room temperature in which the composition comprises two components: at least one bisoxazoline resin and at least one additional resin containing one or more reactive carbon to carbon double bonds. The bisoxazoline resins are prepared from an arylalkylene dinitrile by reaction with an amino alcohol. The low viscosity of these liquid bisoxazoline compositions significantly eases the processing and dispensability of adhesive and encapsulant compositions prepared from them.

This composition of this invention can be cured to a thermoset material, the curing mechanism occurring by the zwitterion polymerization of the bisoxazoline resin with the resin containing one or more reactive carbon to carbon double bonds. The reaction occurs without the need for curing initiators.

The composition can be prepared solely from liquid components, or from a solid component dissolved in a liquid component. As examples, both the bisoxazoline and the resin containing the reactive carbon to carbon double bond can be liquids; or, a solid bisoxazoline resin can be dissolved in a liquid resin containing the carbon to carbon double bond; or, a solid bisoxazoline can be dissolved in a liquid monooxazoline and be blended with a liquid resin containing the carbon to carbon double bond; or, a solid bisoxazoline and a solid resin containing the carbon to carbon double bond can be dissolved in a liquid bisoxazoline.

These compositions can be used as adhesives, coatings and encapsulants, especially within the semiconductor fabrication industry as die attach adhesives and films and as underfill materials, such as no-flow underfills, capillary flow underfills, and wafer level underfills.

DETAILED DESCRIPTION OF THE INVENTION

Arylalkylene dinitriles suitable as starting materials for preparing the liquid bisoxazoline compounds include (but are not limited to) 1,4-phenylene-diacetonitrile, 1,2-phenylene-diacetonitrile, 1,3-di(cyanomethyl)-2,4,6-trimethyl-benzene. Amino alcohols suitable as starting materials for preparing the liquid bisoxazoline compounds include (but are not limited to) 2-amino-3-methyl-1-butanol, 2-amino-1-pentanol, and 2-amino-1-butanol.

The bisoxazoline compounds are prepared by reacting, with heat, an arylalkylene dinitrile with an amino alcohol in a solvent such as o-xylene using a heavy metal salt, preferably a soluble zinc, cobalt, or cadmium salt, as a catalyst. The reaction mixture is cooled and washed with distilled water, the organic layer is dried, the solvent is removed, and the product is collected.

The following are examples of reaction schemes and syntheses for making bisoxazoline compounds. One skilled in the art will recognize and apply the correct stoichiometry.

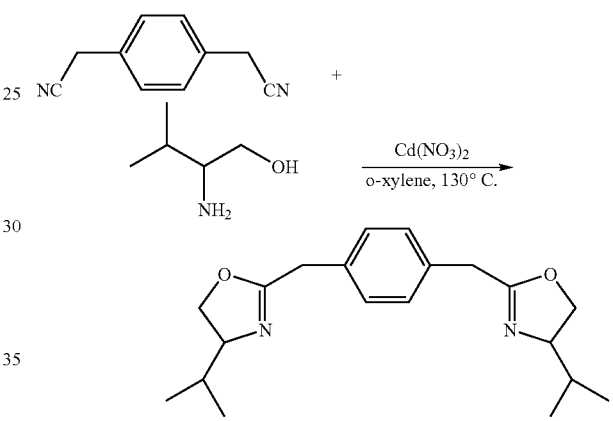

In the above reaction scheme, 1,4-phenylene-diacetonitrile is reacted under nitrogen with 2-amino-3-methyl-1-butanol in o-xylene using cadmium nitrate tetrahydrate as a catalyst at 130° C. for 72 hours. The reaction mixture is cooled and washed twice with distilled water. The organic layer is dried over sodium sulfate and acidic alumina gel and the product obtained after removal of solvent in vacuo.

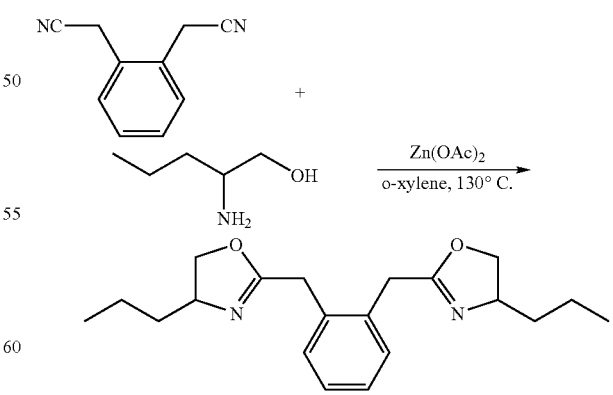

In the above reaction scheme, 1,2-phenylene-diacetonitrile is reacted under nitrogen with 2-amino-1-pentanol in o-xylene using zinc acetate dihydrate as a catalyst at 130° C. for 72 hours. The reaction mixture is cooled and washed with de-ionized water. The organic layer is dried over sodium sulfate and acidic alumina gel and the product obtained after removal of solvent in vacuo.

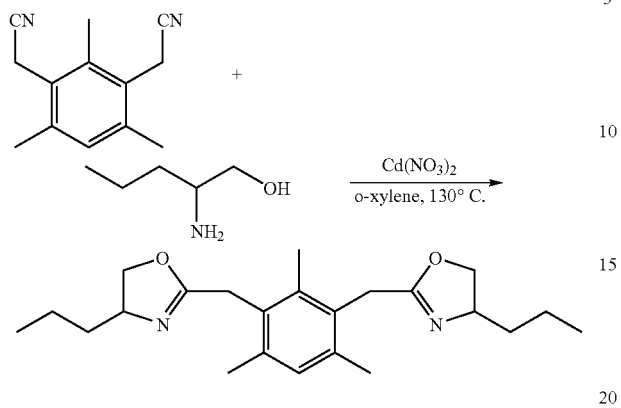

In the above reaction scheme, 1,3-di(cyanomethyl)-2,4,6-trimethylbenzene is reacted under nitrogen with 2-amino-1-pentanol in o-xylene using cadmium nitrate tetrahydrate as a catalyst at 130° C. for 72 hours. The reaction mixture is cooled and washed with de-ionized water. The organic layer is dried over sodium sulfate and acidic alumina gel and the product obtained after removal of solvent in vacuo.

The starting material 1,3-di(cyanomethyl)-2,4,6-trimethylbenzene is prepared by converting 1,3-bis(bromomethyl)-2,4,6-trimethylbenzene as follows.

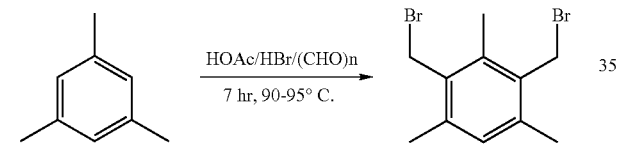

In the above reaction scheme, 98% pure mesitylene and 95% pure paraformaldehyde, glacial acetic acid, and 30% hydrogen bromide in acetic acid solution are slowly heated with stirring to 90-95° C. and held at this temperature for seven hours. After several hours heating, the product dibromide compound begins to precipitate from the reaction mixture. The mixture is allowed to stand at room temperature until precipitation is complete. The crystalline precipitate mass is broken up and stirred to form a uniform slurry, after which additional water is added to complete the precipitation. The slurry is filtered, washed with water, and air-dried in a hood to yield 1,3-bis(bromomethyl)-2,4,6-trimethylbenzene.

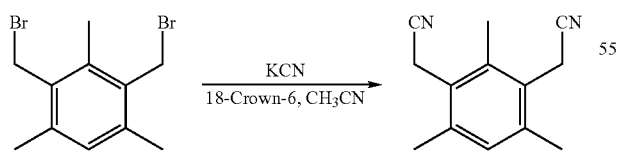

In the above reaction scheme, 1,3-bis(bromomethyl)-2,4,6-trimethylbenzene is reacted with KCN in the presence of a phase transfer catalyst, commonly known as 18-crown-6, (from Aldrich) in acetonitrile. The two-phase system is heated to reflux with vigorous stirring. After two hours, the reaction mixture is cooled, filtered, and evaporated to approximately one-third volume. Distilled water is added, and the mixture is extracted with dichloromethane. The dichloromethane solution is dried over sodium sulfate and filtered, and the solvent evaporated under reduced pressure to obtain 1,3-di(cyanomethyl)-2,4,6-trimethylbenzene.

When solid bisoxazolines are used, a liquid mono-oxazoline can be used as a solvent or diluent. Commercially available (from Aldrich) liquid mono-oxazolines include (but are not limited to)

(S)-(−)-4-benzyl-2-methyl-2-oxazoline

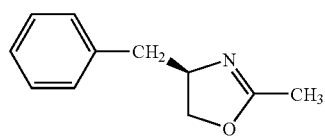

4,4-dimethyl-2-phenyl-2-oxazoline

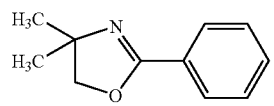

2-ethyl-2-oxazoline

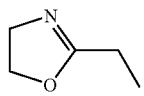

2-[1-(hydroxymethyl)ethyl]-oxazoline

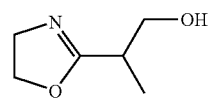

2-isopropenyl-2-oxazoline

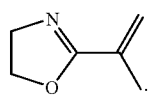

2-phenyl-2-oxazoline

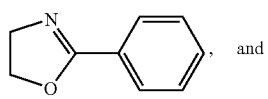, and 2,4,4-trimethyl-2-oxazoline

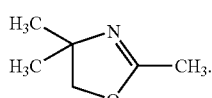

Although a curing initiator or agent is not required for these compounds to undergo polymerization, it may be desirable in some cases to use initiators. Suitable radical initiators include thermal initiators and photoinitiators, present in an amount of 0.1% to 10%, preferably 0.1% to 5.0%, by weight of the oxazoline/vinyl system. Preferred thermal initiators include peroxides, such as butyl peroctoates and dicumyl peroxide, and azo compounds, such as 2,2'-azobis(2-methyl-propanenitrile) and 2,2'-azobis(2-methyl-butanenitrile). A preferred series of photoinitiators is one sold under the trademark Irgacure by Ciba Specialty Chemicals.

In some formulations, both thermal initiation and photoinitiation may be desirable; for example, the curing process can be started by irradiation, and in a later processing step curing can be completed by the application of heat to accomplish the thermal cure. In general, these compositions will cure within a temperature range of 60° C. to 250° C., and curing will be effected at a temperature within the range of ten seconds to three hours. The time and temperature curing profile of each formulation will vary with the specific oxazoline resin and the components containing carbon to carbon double bonds of the formulation, but the parameters of a curing profile can be determined by a practitioner skilled in the art without undue experimentation.

Alternatively, cationic initiators may be used. Suitable cationic initiators include Lewis acids, strong protic acids and their esters, and alkyl halides, present in an amount of 0.1% to 10%, preferably 0.1% to 5.0%, by weight of the oxazoline/carbon to carbon double bond system. Preferred Lewis acids include $BF_3$, $AlCl_3$, $TiCl_4$, $PF_5$, and $SbF_5$. Preferred strong protic acids include $HClO_4$, $CF_3SO_3H$, $H_2SO_4$, and HBr. Preferred strong protic acid esters include sulfonate esters, sulfate esters, and sulfonic anhydrides, such as p-$MeC_6H_4SO_3Me$, p-$O_2NC_6H_4SO_3Me$, $CF_3SO_3Me$, $FSO_3Me$, $(MeO)_2SO_2$, and $(MeSO_2)_2O$. Preferred alkyl halides include $PhCH_2Cl$, $PhCH_2Br$, and MeI. Salts of Lewis acids such as $Et_3O^+BF_4^{-1}$, and alkyl haloformates such as MeOCOCl, can also be used as cationic initiators.

Suitable resins having one or more reactive double bonds include maleimides, acrylates, vinyl ethers, styrenic compounds, cinnamyl compounds, maleates, fumarates, and polymers with pendant vinyl functionality. Preferred resins having reactive double bonds are maleimides, preferred examples of which are the following:

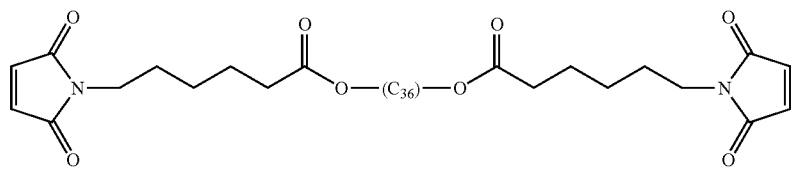

in which $C_{36}$ represents a linear or branched hydrocarbon chain, optionally including one or more cyclic structures, having 36 carbon atoms,

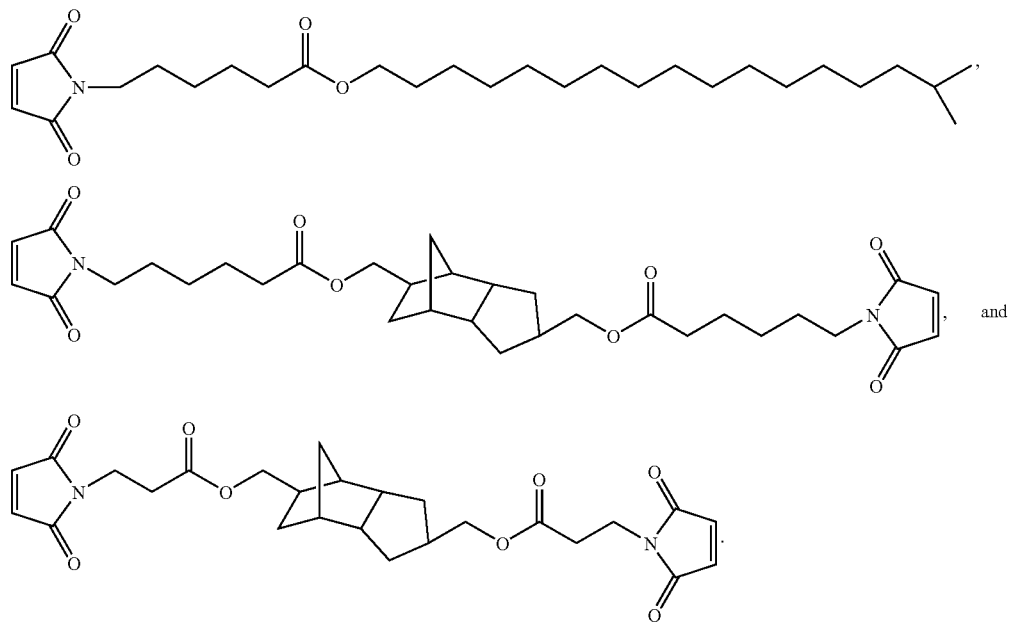

In some compositions it may be desirable to include a filler. Suitable conductive fillers are carbon black, graphite, gold, silver, copper, platinum, palladium, nickel, aluminum, silicon carbide, boron nitride, diamond, and alumina. Suitable non-conductive fillers are particles of vermiculite, mica, wollastonite, calcium carbonate, titania, sand, glass, fused silica, fumed silica, barium sulfate, and halogenated ethylene polymers, such as tetrafluoroethylene, trifluoroethylene, vinylidene fluoride, vinyl fluoride, vinylidene chloride, and vinyl chloride. When present, fillers will be in amounts of 20% to 90% by weight of the formulation.

67.21 g of an amber liquid resin was obtained in a yield of 67%. The viscosity of this resin at room temperature is 250 mPa.·. $^1$H NMR (CDCl$_3$, 400 MHz): δ 7.11-7.19 (m, 4H), 4.20 (t, 2H), 3.91-3.97 (m, 2H), 3.77 (t, 2H), 3.52 (s, 4H), 1.53-1.61 (m, 2H), 1.40-1.47 (m, 2H), 0.86 (t, 6H).

EXAMPLE 2

The liquid bisoxazoline compound from Example 1 was formulated into the following Compositions C-F and their thermal cure profiles compared to those of Compositions A and B containing solid bisoxazolines. Except for Compound II, the materials used in the compositions were liquid and were the following:

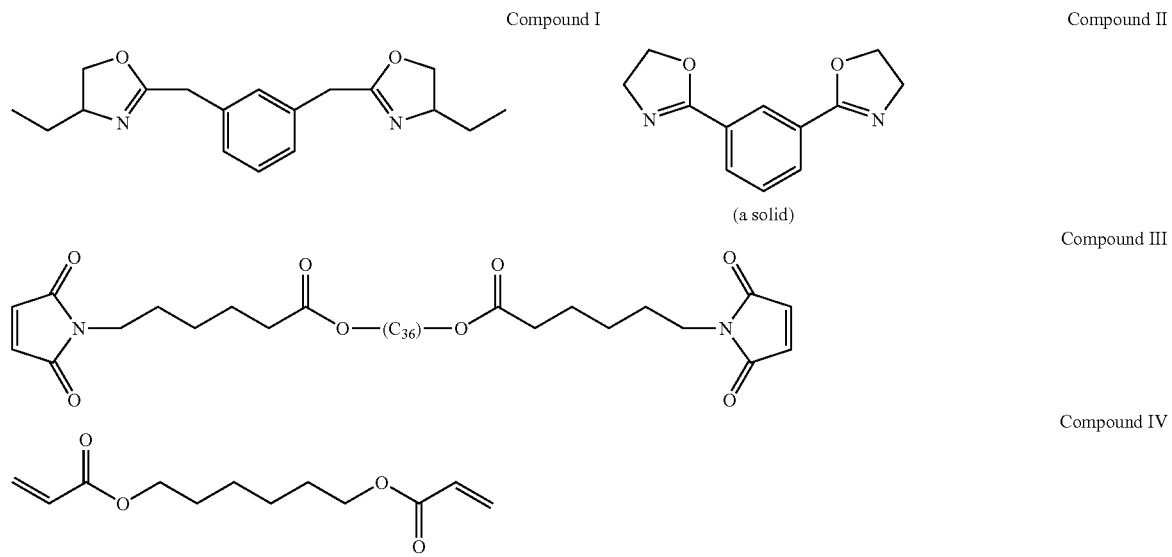

EXAMPLE 1

Preparation of 1,3-bis[(4-ethyl-4,5,-dihydro-2-oxazolyl)methyl]benzene

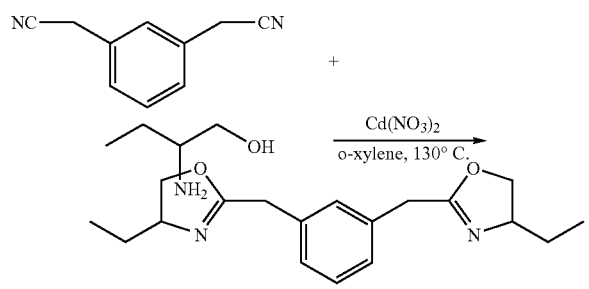

In a one liter four-necked round-bottom flask equipped with a condenser, N$_2$ inlet/outlet, magnetic stirrer, and thermometer, was charged with 52.65 g of 1,3-phenylene-diacetonitrile (0.337 mol, Aldrich), 78.13 g of 2-amino-1-butanol (0.876 mol, Aldrich), and 3.38 g of cadmium nitrate tetrahydrate (0.011 mol, Aldrich) in 300 mL of o-xylene. The mixture was heated to 130° C. and the reaction was run for 72 hours. The cooled mixture was washed with de-ionized water (2×200 mL). The organic layer was dried over sodium sulfate and acidic alumina gel. After removal of solvent in vacuo,

| Composition A | Parts by weight | Weight Percent |
|---|---|---|
| Compound II | 20.5 | 19.3% |
| Compound III | 85.3 | 80.7% |

In Composition A, Compound II was employed as nucleophilic monomer and Compound III was employed as electrophilic monomer in a stoichiometric mixture, i.e., one equivalent of oxazoline monomer per maleimide equivalent. A DSC thermogram showed temperatures for cure onset of 240° C. and cure peak of 290° C. in the absence of any polymerization initiators. The cure exotherm was 69 J/g.

| Composition B | Parts by weight | Weight Percent |
|---|---|---|
| Compound II | 48.2 | 48.9% |
| Compound IV | 50.4 | 51.1% |

In Composition B, Compound II was employed as a nucleophilic monomer and Compound IV was employed as an electrophilic monomer in a stoichiometric mixture, i.e., one equivalent of oxazoline monomer per acrylate equivalent. A DSC thermogram showed temperatures for cure onset of 179° C. and cure peak of 187° C. in the absence of any polymerization initiators. The cure exotherm was 398 J/g.

| Composition C | Parts by weight | Weight Percent |
|---|---|---|
| Compound I | 28.9 | 25.4% |
| Compound III | 85.2 | 74.6% |

In Composition C, Compound I was employed as a nucleophilic monomer and Compound III was employed as an electrophilic monomer in a stoichiometric mixture, i.e., one equivalent of oxazoline monomer per maleimide equivalent A DSC thermogram showed temperatures for cure onset of 113° C. and cure peak of 166° C. in the absence of any polymerization initiators. The cure exotherm was 140 J/g.

| Composition D | Parts by weight | Weight Percent |
|---|---|---|
| Compound I | 53.3 | 56.2% |
| Compound IV | 41.5 | 43.8% |

In Composition D, Compound I was employed as a nucleophilic monomer and Compound IV was employed as an electrophilic monomer in a stoichiometric mixture, i.e., one equivalent of oxazoline monomer per acrylate equivalent. A DSC thermogram showed temperatures for cure onset of 90° C. and cure peak of 110° C. in the absence of any polymerization initiators. The cure exotherm was 295 J/g. This result shows that co-cure of oxazoline compounds and acrylate compounds does occur. The bisoxazoline compound from Example 1, by itself, revealed a cure peak at 200° C. and a small exotherm of 30 J/g. Similarly, the cure of acrylate Compound IV, by itself, occurred at above 200° C. It was also found that Composition D exhibited longer pot-life than Composition E. No gelation was observed in Composition D at ambient temperature after one month.

| Composition E | Parts by weight | Weight Percent |
|---|---|---|
| Compound I | 53.3 | 55.2% |
| Compound IV | 41.5 | 42.9% |
| radical initiator | 1.84 | 1.9% |

In Composition E, Compound I was employed as a nucleophilic monomer and Compound IV was employed as an electrophilic monomer in a stoichiometric mixture, i.e., one equivalent of oxazoline monomer per acrylate equivalent. The radical initiator was Trigonox 23 (from Akzo Nobel). A DSC thermogram showed temperatures for cure onset of 63° C. and cure peak of 76° C. in the presence of a radical polymerization initiator. The cure exotherm was 322 J/g. This result shows that co-cure of oxazoline compounds and acrylate compounds can be accelerated by radical initiators.

| Composition F | Parts by weight | Weight Percent |
|---|---|---|
| Compound I | 51.8 | 55.2% |
| Compound IV | 40.3 | 43.0% |
| methyl p-toluenesulfonate | 1.65 | 1.8% |

In Composition F, Compound I was employed as a nucleophilic monomer and Compound IV was employed as an electrophilic monomer in a stoichiometric mixture, i.e., one equivalent of oxazoline monomer per acrylate equivalent Methyl p-toluenesulfonate (a cationic initiator from Aldrich) was used as a catalyst. A DSC thermogram showed temperatures for cure onset of 112° C. and cure peak of 139° C. in the presence of a cationic polymerization initiator. The cure exotherm was 179 J/g.

The Differential Scanning Calorimeter thermogram results are tabulated below and show that the liquid bisoxazoline compositions give a rapid cure as shown by the low cure onset and peak temperatures, and also a good thorough cure as shown by high delta H values.

| Composition | Onset Temp (° C.) | Peak Temp (° C.) | Delta H (J/g) |
|---|---|---|---|
| A | 240 | 290 | 69 |
| B | 179 | 187 | 398 |
| C | 113 | 166 | 140 |
| D | 90 | 110 | 295 |
| E | 63 | 76 | 322 |
| F | 112 | 139 | 179 |

What is claimed is:

1. A curable liquid composition consisting essentially of a bisoxazoline compound and 1,6-hexanediol diacrylate.

2. The composition according to claim 1 in which the bisoxazoline compound has the structure

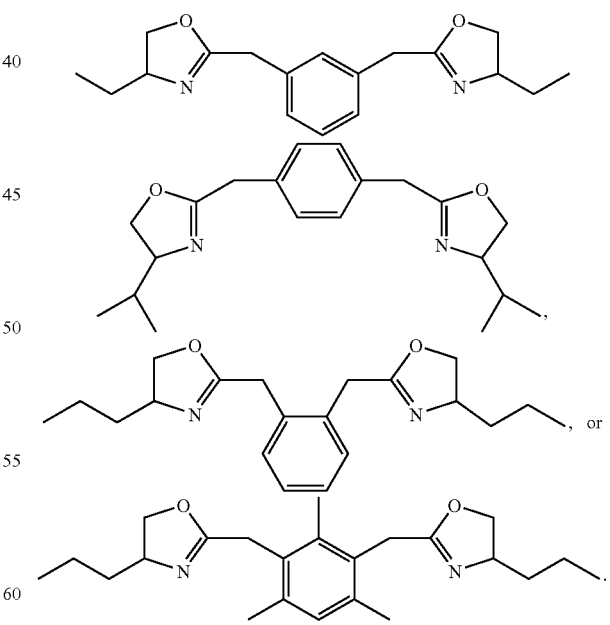

3. A method of preparing a thermoset composition consisting essentially of
   (a) providing a bisoxazoline compound selected from the group consisting of

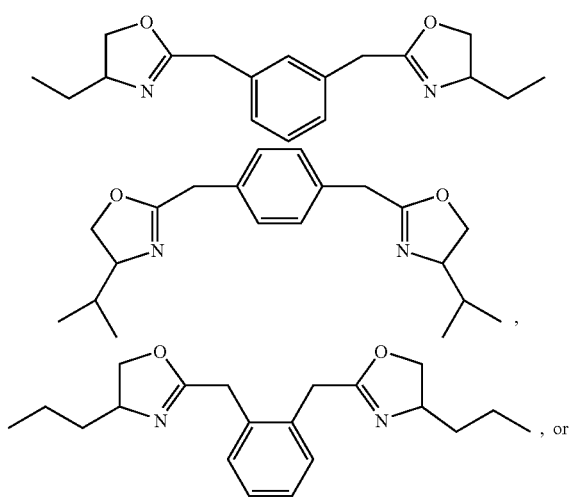, 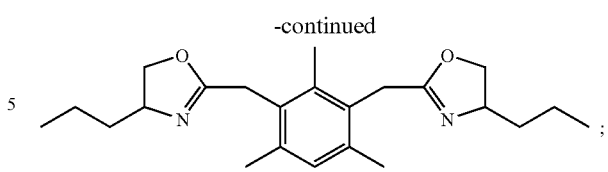

(b) providing 1,6-hexanediol diacrylate;

in which both (a) and (b) are liquids, or either one of (a) and (b) is a liquid and the other is soluble in that liquid, or both (a) and (b) are solids and are solubilized in a monooxazoline resin;

(c) reacting (a) and (b) with the application of heat to cause the zwitter ion polymerization of the bisoxazoline compound (a) with 1,6-hexanediol diacrylate (b) without the need for curing initiator.

* * * * *